(12) United States Patent
Umansky et al.

(10) Patent No.: US 8,591,726 B2
(45) Date of Patent: Nov. 26, 2013

(54) TWO STAGE HYDROPROCESSING WITH DIVIDED WALL COLUMN FRACTIONATOR

(75) Inventors: Benjamin S. Umansky, Fairfax, VA (US); Richard C. Dougherty, Moorestown, NJ (US); Michael A. Hayes, Washington, NJ (US); William E. Lewis, Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 342 days.

(21) Appl. No.: 13/168,240

(22) Filed: Jun. 24, 2011

(65) Prior Publication Data

US 2012/0004478 A1 Jan. 5, 2012

Related U.S. Application Data

(60) Provisional application No. 61/359,883, filed on Jun. 30, 2010.

(51) Int. Cl.
*C10G 3/00* (2006.01)

(52) U.S. Cl.
USPC ............. 208/49; 208/209; 208/210; 208/212; 208/308; 208/347

(58) Field of Classification Search
USPC .................... 208/49, 209–210, 212, 308, 347
See application file for complete search history.

(56) References Cited

U.S. PATENT DOCUMENTS

| | | | |
|---|---|---|---|
| 3,412,016 A | 11/1968 | Graven | |
| 6,123,835 A | 9/2000 | Ackerson et al. | |
| 6,217,749 B1 | 4/2001 | Espeillac et al. | |
| 6,261,441 B1 | 7/2001 | Gentry et al. | |
| 6,428,686 B1 | 8/2002 | Ackerson et al. | |
| 6,881,326 B2 | 4/2005 | Ackerson et al. | |
| 7,291,257 B2 | 11/2007 | Ackerson et al. | |
| 7,622,034 B1 | 11/2009 | Thakkar et al. | |
| 2005/0082202 A1 | 4/2005 | Ackerson et al. | |
| 2008/0173570 A1 | 7/2008 | Marchand et al. | |
| 2009/0095651 A1 | 4/2009 | Leonard et al. | |
| 2009/0095653 A1 | 4/2009 | Kokayeff et al. | |
| 2009/0095655 A1 | 4/2009 | Kokayeff et al. | |
| 2009/0095656 A1 | 4/2009 | Kokayeff et al. | |
| 2009/0107033 A1 | 4/2009 | Gudde et al. | |

FOREIGN PATENT DOCUMENTS

| | | |
|---|---|---|
| EP | 0 819 752 B1 | 4/2001 |
| WO | 2009/052025 A2 | 4/2009 |
| WO | 2010/002903 A2 | 1/2010 |
| WO | 2011068666 A1 | 6/2011 |
| WO | 2011133829 A1 | 10/2011 |

OTHER PUBLICATIONS

C. Schmitz, L. Datsevitch, A. Jess, "Deep desulfurization of diesel oil: kinetic studies and process-improvement by the use of a two-phase reactor with pre-saturator", Chemical Engineering Science 59 (2004) pp. 2821-2829.
The International Search Report and Written Opinion of PCT/US2011/041732 dated Mar. 14, 2013.
Hilbert, T.L. et al., "Consider new technology to produce 'clean' diesel", Hydrocarbon Processing, Feb. 2008.

*Primary Examiner* — Brian McCaig
(74) *Attorney, Agent, or Firm* — D. M. Weisberg; B. M. Bordelon (57) ABSTRACT

A divided wall column can allow for fractionation of multiple streams while maintaining separate product qualities. Effluents from multiple stages of a reaction system can be processed in a single divided wall column. The divided wall column can produce multiple cuts from each separated area, as well as at least one output from a common area. At least one reaction stage can advantageously have a continuous liquid phase environment.

10 Claims, 3 Drawing Sheets

TWO STAGE HYDROPROCESSING WITH DIVIDED WALL COLUMN FRACTIONATOR

CROSS-REFERENCE TO RELATED APPLICATIONS

This application claims the benefit of U.S. Application No. 61/359,883, filed Jun. 30, 2010, the entire contents of which are hereby incorporated by reference herein.

FIELD OF THE INVENTION

This invention provides methods for multi-stage hydroprocessing using a divided wall column as a fractionator.

BACKGROUND OF THE INVENTION

The equipment necessary for refining operations is one of the major sources of costs in a refinery. The equipment can include catalytic reactors, fractionators and/or separators, and other supporting equipment. In a conventional process train, each catalytic reactor can have a dedicated fractionator or separator associated with the reactor, to separate out the various products produced in the catalytic reaction stage.

One method for saving on capital costs is to allow more than one reactor to use the same fractionator. U.S. Pat. No. 3,412,016 shows an example of a fractionator that includes multiple volumes. In this patent, two independent refinery gasoline streams (such as a low octane and a high octane gasoline) are fractionated in the fractionator. In the fractionator, the light ends portions of the two gasoline fractions are allowed to mix. However, there is no description or suggestion of any interaction, recycling, or other mixing of the gasoline "bottoms" portions. The outputs from the fractionator are a light fraction and the two distinct heavy fractions.

European Patent Publication No. EP 0819752 appears to provide another example of using a fractionator having multiple volumes. In this publication, it appears that two separate input streams are provided to the fractionator. The vapor portions produced in each side of the fractionator are allowed to mix, leading to production of one or more light product fractions from the fractionator. Each side of the fractionator also produces a bottoms portion. In some figures, the bottom portions appear to remain separated after leaving the fractionator, while in other figures the input to the second side of the fractionator includes portions of the bottoms from both sides of the fractionator.

U.S. Published Patent Application 2009/0095655 describes methods for hydrocracking a mineral hydrocarbon stream. A hydrocarbon stream is treated first in a gas-phase continuous zone. The effluent from the hydrotreating zone is then hydrocracked in one or more zones. The hydrocracking zones can be gas-phase continuous zones or liquid-phase continuous zones.

SUMMARY OF THE INVENTION

One aspect of the invention relates to a method for producing low sulfur distillate products, comprising: hydrotreating a feedstock under first effective hydrotreating conditions; fractionating the hydrotreated feedstock in a first volume of a divided wall column fractionator to produce at least a first product fraction, a first bottoms fraction, and a first common fraction that is passed to an upper undivided volume of the fractionator; dissolving hydrogen in at least a portion of the first bottoms fraction to approximately the solubility limit; hydrocracking the portion of the first bottoms fraction under effective hydrocracking conditions in a hydrocracking stage having a continuous liquid environment; and fractionating the hydrocracked first bottoms fraction in a second volume of the divided wall column fractionator to produce at least a second product fraction, a third product fraction, and a second common fraction that is passed to the upper undivided volume of the fractionator, wherein the second product fraction has at least one improved property relative to the first product fraction and the third product fraction has at least one improved property relative to the bottoms fraction.

Another aspect of the invention relates to a method for producing low sulfur distillate products, comprising: hydrotreating a feedstock under effective hydrotreating conditions; hydrocracking the hydrotreated feedstock in a first hydrocracking stage under first effective hydrocracking conditions; fractionating the hydrocracked feedstock in a first volume of a divided wall column fractionator to produce at least a first diesel product fraction and a first bottoms fraction; hydrocracking a portion of the bottoms fraction in a second hydrocracking stage having a continuous liquid environment under second effective hydrocracking conditions; dewaxing the hydrocracked portion of the first bottoms fraction in a dewaxing stage having a continuous liquid environment under effective dewaxing conditions; and fractionating the hydrocracked, dewaxed bottoms fraction in a second volume of the divided wall column fractionator to produce at least a second diesel product fraction and a second bottoms fraction, wherein the second diesel product fraction has at least one improved cold flow property relative to the first diesel product fraction, and the second bottoms fraction has at least one improved cold flow property relative to the first bottoms fraction.

DETAILED DESCRIPTION OF THE EMBODIMENTS

This invention provides various systems and methods for improved processing of hydrocarbon feeds. In various embodiments, the advantages of the systems and methods can include, but are not limited to, reduced equipment needs and/or reduced cost production of multiple distillate product streams from multiple reactor systems.

According to the invention, a divided wall column is employed as a fractionator as part of a two-stage hydrotreatment and/or hydrocracking unit. The divided wall column can advantageously allow for lower cost production of diesel fuel, such as with a sulfur content of about 50 wppm or less, for example about 30 wppm or less, about 20 wppm or less, about 15 wppm or less, or about 10 wppm or less. In these two-stage units, two hydrotreatment and/or hydrocracking reactors can be employed to share a single fractionator. The effluent from the first hydrotreatment and/or hydrocracking stage can be delivered to a first volume of the divided wall column. The effluent delivered to this first volume can be fractionated into at least two heavier fractions and one or more lighter fractions. The heavier fractions can exit the fractionator from a location below the height of the dividing wall, while the lighter fractions can exit the fractionator from the common portion of the fractionator, above the dividing wall. The at least two heavier fractions can include a bottoms fraction and a product fraction, such as a diesel boiling range fraction. At least a portion of the bottoms fraction can be sent to the second hydrotreatment and/or hydrocracking reactor. Optionally, at least a portion of the product (diesel) fraction can also be sent to the second reactor. The effluent from the second reactor can then be passed to the second volume of the divided wall column to produce at least two additional heavier fractions and one or more lighter fractions. The at least two heavier fractions from this second reactor can also include a bottoms fraction and a product fraction, such as a diesel product with a sulfur content of about 30 wppm or less, for example about 20 wppm or less, about 15 wppm or less, or about 10 wppm or less. In this type of embodiment, the separate volumes of the divided wall column can advantageously enable production of a lower sulfur (diesel boiling range) product.

In the above type of reaction system, a further improvement can be achieved by preventing any recycle of product from the bottoms and/or product (diesel) fraction(s) of the second fractionator volume. In processes involving relatively severe hydrotreatment and/or hydrocracking of vacuum gas oil fractions, for example, one concern can include production of polynuclear aromatics (PNAs). PNA compounds involve two or more fused aromatic rings in their structures. Processes where heavy compounds can be recycled multiple times can lead to increased production of PNAs. In an embodiment, PNA production can be reduced and/or mitigated while also reducing costs by using a divided wall column as a fractionator. In this type of embodiment, at least a portion of the bottoms from the first volume of the divided wall column can be sent to the second hydrotreatment and/or hydroprocessing reactor. The effluent from this reactor can then be sent to the second volume of the fractionator. The bottoms from the second fractionator volume, however, are preferably not recycled. As a result, the heavy portions of the initial feed need not be exposed additional times to the reaction stages in the second reactor. This type of embodiment can provide the reduced cost of using a single fractionator for a multi-stage hydrocracking process, while also reducing/minimizing production of PNAs.

In a variation on the above embodiments, one or more of the hydrocracking reaction stages can be a hydrocracking stage with a continuous liquid environment. One option can be to use a hydrocracking and/or isomerization stage with a continuous liquid environment as a reaction stage for a hydrotreated bottoms fraction (or other heavy fraction) produced by the first fractionator volume. A hydroprocessing stage in a continuous liquid environment can reduce the amount of hydrogen needed to process a feed. In contrast to a hydroprocessing stage in a gas-phase continuous environment, hydroprocessing in a continuous liquid phase environment can be performed with an amount of hydrogen comparable to the amount required for the hydroprocessing reactions. Thus, the amount of hydrogen required can be reduced, as a substantial excess of hydrogen is not needed. In this type of option, a feed can be initially hydrotreated to reduce the amount of aromatics in the feed. This can reduce the required amount of hydrogen for processing the feed. Optionally, a hydrocracking stage with a continuous liquid environment can also be included after a hydrotreatment stage but prior to the first fractionation volume.

In another type of embodiment, multiple reactors and a divided wall column can be used to produce varying grades of distillate and/or gas oil products at a reduced cost. In such an embodiment, the first reactor can include one or more hydrotreatment and/or hydrocracking stages, in order to provide a feed with suitable sulfur content, such as a sulfur content of about 50 wppm or less, for example about 30 wppm or less, about 20 wppm or less, about 15 wppm or less, or about 10 wppm or less. The effluent from this reactor can be sent to a first volume of a divided wall column for fractionation. The first volume of the fractionator can advantageously produce at least a product (diesel) fraction, a bottoms fraction, and a lighter fraction which can exit the divided wall column from a common volume. The product (diesel) fraction can be suitable for use as standard diesel fuel or may, optionally and less preferably, be subject to further processing/treatment before being used in fuel applications. At least a portion of the bottoms fraction can then be sent to a second reactor including a catalytic dewaxing stage. Optionally, a portion of the product (diesel) fraction can also be sent to the second reactor. Additionally or alternately, the second reactor can optionally include other stages, such as hydrotreatment, hydrocracking, and/or hydrofinishing stages. The effluent from the second reactor can be sent to the second volume of the divided wall column. When the product fraction boils in the diesel range, this can result in production of at least an arctic diesel fraction, a bottoms fraction with improved cold flow properties, and a lighter fraction that can exit the divided wall column from a common volume. In this type of embodiment, the two reactors in combination with the divided wall column can produce at least four types of distillate products. The distillate products can include a diesel product, an arctic diesel product having improved cold flow properties relative to the diesel product, a vacuum gas oil product as the bottoms from the first fractionator volume (which could optionally be suitable as an FCC feedstock), and a vacuum gas oil product with improved cold flow properties as the bottoms from the second fractionator volume (which could optionally be suitable for further processing as a lube basestock).

Feedstocks

In an embodiment, a feedstock processed in a reaction system that includes a divided wall column can be a feedstock with an initial boiling point of at least about 400° F. (about 204° C.), for example at least about 450° F. (about 232° C.), at least about 500° F. (about 260° C.), at least about 550° F. (about 288° C.), at least about 600° F. (about 316° C.), or at least about 650° F. (about 343° C.). Additionally or alternately, the feedstock can have a final boiling point of about 1200° F. (about 649° C.) or less, for example about 1100° F. (about 593° C.) or less, about 1050° F. (about 566° C.) or less, about 1000° F. (about 538° C.) or less, or about 900° F. (about 482° C.) or less. Further additionally or alternately, the feedstock can be characterized by the boiling point required to boil a specified percentage of the feed. For example, the temperature required to boil at least 5 wt % of a feed is referred to as a "T5" boiling point. In one preferred embodiment, the feedstock can have a T5 boiling point of at least about 400° F. (about 204° C.), for example at least about 450° F. (about 232° C.), at least about 500° F. (about 260° C.), at least about 550° F. (about 288° C.), at least about 600° F. (about 316° C.), at least about 650° F. (about 343° C.), or at least about 665° F. (about 352° C.). Additionally or alternately, the feedstock can preferably have a T95 boiling point of about 1150° F. (about 621° C.) or less, for example about 1100° F. (about 593° C.) or less, about 1050° F. (about 566° C.) or less, about 1000° F. (about 538° C.) or less, about 900° F. (about 482° C.) or less, or about 850° F. (about 454° C.) or less.

The feedstock generally comprises a mineral oil. By "mineral oil" is meant a fossil/mineral fuel source, such as crude oil, and not the commercial organic product, such as sold under the CAS number 8020-83-5, e.g., by Aldrich. Examples of mineral oils can include, but are not limited to, straight run (atmospheric) gas oils, vacuum gas oils, demetallized oils, coker distillates, cat cracker distillates, heavy naphthas, diesel boiling range distillate fraction, jet fuel boiling range distillate fraction, kerosene boiling range distillate fraction, and coal liquids. The mineral oil portion of the feedstock can comprise any one of these example streams or any combination thereof. Preferably, the feedstock does not contain any appreciable asphaltenes.

The mineral oil portion of the feedstock can contain nitrogen-containing compounds (abbreviated as "nitrogen"). For example, the mineral oil can contain at least about 5 wppm nitrogen, based on total weight of the mineral oil component. Preferably, the mineral oil contains not greater than about 1.0 wt % nitrogen, based on total weight of the mineral oil component. In general, at least a majority of the nitrogen will be in the form of organonitrogen compounds.

The mineral oil portion of the feedstock will typically contain sulfur-containing compounds (abbreviated as "sulfur" or "sulfur content"). Such compounds can typically be present in the mineral oil at a sulfur content greater than about 100 wppm, often greater than about 500 wppm or greater than about 0.1 wt %, based on total weight of the mineral oil. Preferably, the sulfur content of the mineral oil will not be greater than about 6 wt %, preferably not greater than about 4 wt %, based on total weight of the mineral oil.

Additionally or alternately, mineral oil feedstreams suitable for use in various embodiments can have from about 50 wppm to about 6000 wppm nitrogen, preferably about 50 wppm to about 2000 wppm nitrogen or from about 75 wppm to about 1000 wppm nitrogen. Further additionally or alternately, feedstreams suitable for use herein can have from about 100 wppm to about 40,000 wppm sulfur, preferably from about 200 wppm to about 30,000 wppm sulfur or from about 350 wppm to about 25,000 wppm sulfur.

In various embodiments of the invention, the feed can additionally or alternately include feeds from biocomponent sources, such as vegetable, animal, fish, and/or algae. Generally, these biological materials include vegetable fats/oils, animal fats/oils, fish oils, pyrolysis oils, and algae lipids/oils, as well as components of such materials. More specifically, the lipid material includes one or more type of lipid compounds. Lipid compounds are typically biological compounds that are insoluble in water, but soluble in nonpolar (or fat) solvents. Non-limiting examples of such solvents include alcohols, ethers, chloroform, alkyl acetates, benzene, and combinations thereof.

Major classes of lipids include, but are not necessarily limited to, fatty acids, glycerol-derived lipids (including fats, oils and phospholipids), sphingosine-derived lipids (including ceramides, cerebrosides, gangliosides, and sphingomyelins), steroids and their derivatives, terpenes and their derivatives, fat-soluble vitamins, certain aromatic compounds, and long-chain alcohols and waxes.

In living organisms, lipids generally serve as the basis for cell membranes and as a form of fuel storage. Lipids can also be found conjugated with proteins or carbohydrates, such as in the form of lipoproteins and lipopolysaccharides.

Examples of vegetable oils that can be used in accordance with this invention include, but are not limited to rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil and rice bran oil.

Vegetable oils as referred to herein can also include processed vegetable oil material. Non-limiting examples of processed vegetable oil material include fatty acids and fatty acid alkyl esters. Alkyl esters typically include $C_1$-$C_5$ alkyl esters. One or more of methyl, ethyl, and propyl esters are preferred.

Examples of animal fats that can be used in accordance with the invention include, but are not limited to, beef fat (tallow), hog fat (lard), turkey fat, fish fat/oil, and chicken fat. The animal fats can be obtained from any suitable source including restaurants and meat production facilities.

Animal fats as referred to herein also include processed animal fat material. Non-limiting examples of processed animal fat material include fatty acids and fatty acid alkyl esters. Alkyl esters typically include $C_1$-$C_5$ alkyl esters. One or more of methyl, ethyl, and propyl esters are preferred.

Algae oils or lipids are typically contained in algae in the form of membrane components, storage products, and metabolites. Certain algal strains, particularly microalgae such as diatoms and cyanobacteria, contain proportionally high levels of lipids. Algal sources for the algae oils can contain varying amounts, e.g., from 2 wt % to 40 wt % of lipids, based on total weight of the biomass itself.

Algal sources for algae oils include, but are not limited to, unicellular and multicellular algae. Examples of such algae include a rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof. In one embodiment, algae can be of the classes Chlorophyceae and/or Haptophyta. Specific species can include, but are not limited to, *Neochloris oleoabundans, Scenedesmus dimorphus, Euglena gracilis, Phaeodactylum tricornutum, Pleurochrysis camerae, Prymnesium parvum, Tetraselmis chui*, and *Chlamydomonas reinhardtii*.

The feedstock can include varying amounts of feedstreams based on biocomponent sources. When desired, the feed can include at least about 0.1 wt % of feed based on a biocomponent source, for example at least about 0.5 wt %, at least about 1 wt %, at least about 3 wt %, at least about 5 wt %, at least about 10 wt %, or at least about 15 wt %. In such embodiments, the feed can additionally or alternately include about 60 wt % or less of biocomponent feed, for example about 50 wt % or less, about 40 wt % or less, or about 30 wt % or less. In other embodiments, the amount of biocomponent feed (e.g., for co-processing with the mineral oil portion of the feed) can be relatively small, for instance with a feed that includes at least about 0.5 wt % of feedstock based on a biocomponent source, e.g., at least about 1 wt %, at least about 2.5 wt %, or at least about 5 wt %. In such embodiments, the feed can additionally or alternately include about 20 wt % or less of biocomponent based feedstock, for example about 15 wt % or less, about 10 wt % or less, or about 5 wt % or less.

The biocomponent feeds usable in the present invention can include any of those which comprise primarily triglycerides and free fatty acids (FFA). The triglycerides and FFAs typically contain aliphatic hydrocarbon chains in their structure having from 8 to 36 carbons, preferably from 10 to 26 carbons, for example from 14 to 22 carbons. Types of triglycerides can be determined according to their fatty acid constituents. The fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis. In one embodiment, a majority (i.e., greater than 50%) of the triglyceride present in the lipid material can be comprised of $C_{10}$ to $C_{26}$ fatty acid constituents, based on total triglyceride present in the lipid material. Further, a triglyceride is a molecule having a structure identical to the reaction product of glycerol and three fatty acids. Thus, although a triglyceride is described herein as being comprised of fatty acids, it should be understood that the fatty acid component does not necessarily contain a carboxylic acid hydrogen. In one embodiment, a majority of triglycerides present in the biocomponent feed can preferably be comprised of $C_{12}$ to $C_{18}$ fatty acid constituents, based on total triglyceride content. Other types of feed that are derived from biological raw material components can include fatty acid esters, such as fatty acid alkyl esters (e.g., FAME and/or FAEE).

Biocomponent based diesel boiling range feedstreams typically have relatively low nitrogen and sulfur contents. For example, a biocomponent based feedstream can contain up to about 300 wppm nitrogen, for example up to about 100 wppm nitrogen. Instead of nitrogen and/or sulfur, the primary heteroatom component in biocomponent feeds is oxygen. Biocomponent diesel boiling range feedstreams, e.g., can include as much as about 10-12 wt % oxygen.

Divided Wall Column as a Fractionator

In various embodiments, a divided wall column can be employed as a fractionation tower. The divided wall column can contain at least three separate volumes. One of the volumes is a common volume, typically located toward the top of the divided wall column. The remaining volumes in the divided wall column can represent volumes separated from each other by a dividing wall. The various volumes are all in fluid communication with each other via the common volume. However, petroleum fractions with a sufficiently high boiling point should typically not be able to travel up the column to a sufficient height to reach the common volume, for example thus effectively fractionating the petroleum fractions by boiling point.

In various embodiments below, the divided wall column is described as having one common volume and two separated volumes. However, a divided wall column could also have three or more separated volumes, so long as there is at least one common volume shared between at least two of the separated volumes and as many as all of the separated volumes.

The volumes can be arranged in any configuration convenient for the desired fractionations. One option is to have each of the separated volumes occupy roughly equal portions of the divided section. For example, a divided wall column with two separated areas and one common area above could have each of the separated areas occupy roughly half of the lower portion of the divided wall column. Similarly, a divided wall column with three separated areas could have each separated area occupy approximately a third of the lower portion. Alternatively, more than one, or each, of the separated areas can have different volumes, which, depending on the conditions under which the divided wall column is operated, may be proportioned relative to the amounts of each volume expected.

In various embodiments, the position of the dividing wall can be any convenient position that leads to the appropriate volumes for the separated areas. For a divided wall column having a roughly rounded cylindrical shape, one option includes having a dividing wall that corresponds to a diameter of the column, which would produce two separated areas with roughly equal volumes. Another option includes having a dividing wall that corresponds to a chord connecting two points on the circumference of the rounded shape or to a pie wedge involving roughly two radii of the rounded shape, thus leading to different volumes in each separated area. Still another option includes have a dividing wall that creates concentric circular volumes for the separated portions. While it is believed that roughly rounded cylindrical shapes are preferred for the external shell of divided wall columns, the above placements for a dividing wall can be equally applied to columns having other shapes.

In an embodiment, the dividing wall can have a height that is tall enough to allow for removal of two or more fractions from a separated volume within the column. This means that at least two fractions that do not mix with the common volume can be removed from a separated area. For example, a separated volume could be used to produce both a vacuum gas oil bottoms stream and a diesel stream that are withdrawn from the separated volume at a location below the height of the dividing wall. In one preferred embodiment, the dividing wall can have a height that is sufficient to allow for removal of two or more fractions from each of the separated volumes.

In another embodiment, the height of the dividing wall can be selected based on controlling the amount of contamination between the multiple product fractions produced by the column. For example, in a divided wall column that produces diesel fractions, the separated volumes can be used to produce two diesel fractions of different quality, such as one diesel fraction with a higher amount of sulfur and a second diesel fraction that satisfies a more stringent specification (i.e., having a lower sulfur content). In such an example, it may be desirable to limit the amount of exchange that occurs between the two diesel fractions. To limit such exchange, the height of the dividing wall can be selected to limit the amount of "contamination" between the fractions. In an embodiment, the dividing wall can have a sufficient height so that less than about 10 wt % of the product from a first separated volume corresponds to substances from a second separated volume, for example less than about 5 wt %, less than about 1 wt %, less than about 0.1 wt %, or less than about 0.05 wt %. The amount of contamination allowed/desired can be dependent on the nature of the product. For example, if contamination can cause a product to fall outside of a government-mandated specification or other requirement, the dividing wall height can be selected to limit contamination to a more stringent level, such as less than about 0.1 wt % or less than about 0.05 wt %. Alternately, if the desire to reduce contamination is due merely to decrease in product value with a decrease in purity, the dividing wall height could be balanced against other economic considerations. In an embodiment, simulations and/or model compound experiments can be used to determine an appropriate dividing wall height.

Additionally or alternatively, the height of the dividing wall can be selected based on the location of a condensing zone in the column. For a given product produced by a distillation column, the condensing zone or stage for the product can represent an upper limit for the expected height of travel for vapor of the given product. For the example of preventing contamination between diesel fractions, selecting a dividing wall height corresponding to the condensing zone for a diesel fraction would be expected to limit contamination to about 3 wt % or less, for example to about 1 wt % or less, to about 0.1 wt % or less, or to about 0.05 wt % or less.

Further additionally or alternatively, the height of the dividing wall can be selected in relation to one or more features of the divided wall column. For example, the height of the dividing wall can be selected to correspond approximately to the height between the bottom of the column and the height of the flash zone. Still further additionally or alternatively, the height of the dividing wall can correspond to the height of the bottom section of trays in the column.

Yet further additionally or alternatively, the height of the dividing wall can be at least about 15% of the height of the divided wall column, for example at least about 25% or at least about 30%. Again additionally or alternately, the height of the dividing wall can be about 75% or less of the height of the divided wall column, for example about 60% or less, about 50% or less, about 40% or less, or about 30% or less. In additional or alternate embodiments, the height of the divided wall column can be about 75 meters or less, for example about 50 meters or less, about 35 meters or less, about 25 meters or less, or about 15 meters or less.

In embodiments where a divided wall column is replacing one or more existing fractionation columns, the diameter of a divided wall column can be selected so that the cross-sectional areas of the separate volumes roughly correspond to the cross-sectional areas of the individual fractionation columns that are being replaced. In an embodiment, the cross-sectional areas of the separate volumes can be within about 10% or less of the cross-sectional areas of the individual fractionation columns being replaced, or within about 5% or less.

In most practical embodiments, the interior of the divided wall column can include typical components of a fractionator. For example, a series of trays can be located in the divided wall column to assist with fractionation. Some of the trays can be located in the common volume. Other trays can be located in the separate volumes. The tray locations and/or spacing in the separate volumes can be the same or different in each volume. As an alternative to trays, any other type of internal structure typically found in a fractionator can be used, such as random packings, structured packings, grids, liquid and/or vapor distributors, liquid and/or vapor collectors, or the like, or combinations thereof. The divided wall column can additionally or alternatively include other typical fractionator elements, such as a flash zone and/or a sump.

Reaction Conditions—Continuous Gas Phase Environment

In various embodiments, a reactor with a continuous gas phase environment can be used for hydrotreatment or hydrocracking of a feedstock. A trickle bed reactor is an example of a reactor having a continuous gas phase environment. In a hydrotreatment stage, a feed can be exposed to a hydrotreatment catalyst under effective hydrotreatment conditions. The catalyst in a hydrotreatment stage can be a conventional hydrotreating catalyst, such as a catalyst composed of a Group VIB metal and/or a Group VIII metal, optionally but preferably on a support. Suitable metals can include, but are not limited to, cobalt, nickel, molybdenum, tungsten, or combinations thereof. Preferred combinations of metals include NiMo and NiCoMo. Suitable supports can include, but are not limited to, silica, silica-alumina, alumina, titania, zirconia, and combinations thereof.

The reaction conditions in a hydrotreatment stage can be conditions suitable for reducing the sulfur content of the feedstream. In many embodiments, the reaction conditions can include a liquid hourly space velocity (LHSV) from about 0.3 $hr^{-1}$ to about 5.0 $hr^{-1}$, a total pressure from about 500 psig (about 3.4 MPag) to about 3000 psig (about 20.7 MPag), a treat gas containing at least about 80% hydrogen (remainder relatively inert gas), and a temperature from about 500° F. (about 260° C.) to about 800° F. (about 427° C.). In one preferred embodiment, the reaction conditions can include an LHSV from about 0.5 $hr^{-1}$ to about 1.5 $hr^{-1}$, a total pressure from about 1400 psig (about 9.7 MPag) to about 2000 psig (about 13.8 MPag), and a temperature from about 700° F. (about 371° C.) to about 750° F. (about 399° C.).

Sometimes, the amount of treat gas delivered to a hydrotreatment stage having a continuous gas phase environment can be based on the stoichiometric consumption of hydrogen in the stage. Thus, in one embodiment, the treat gas rate for a hydrotreatment stage can be from about two to about five times the amount of hydrogen consumed per barrel of fresh feed in the stage. A typical hydrotreatment stage can consume from about 50 scf/bbl (about 8.5 $Nm^3/m^3$) to about 1000 scf/bbl (about 170 $Nm^3/m^3$) of hydrogen, depending on various factors including, but not limited to, the nature of the feed being hydrotreated. Thus, in such an embodiment, the treat gas rate can be from about 100 scf/bbl (about 17 $Nm^3/m^3$) to about 5000 scf/bbl (about 850 $Nm^3/m^3$). In one preferred embodiment, the treat gas rate can be from about four to about five times the amount of hydrogen consumed. Note that the above treat gas rates refer to the rate of hydrogen flow; if hydrogen is delivered as part of a gas stream having less than 100% hydrogen, the treat gas rate for the overall gas stream can be proportionally higher.

Various embodiments of the invention can include one or more hydrocracking stages that have a continuous gas phase environment. Examples of non-noble-metal hydrocracking catalysts can include, but are not limited to, those containing Ni, NiCoMo, CoMo, NiW, and/or NiMo, with one or a combination of the latter two being preferred. Non-limiting examples of noble metal hydrocracking catalysts can include those based on platinum and/or palladium. Porous support materials which may be used for either or both of the noble and non-noble-metal hydrocracking catalysts can comprise a refractory oxide material such as alumina, silica, alumina-silica, kieselguhr, diatomaceous earth, magnesia, zirconia, or a combination thereof, with alumina, silica, and alumina-silica being preferred and the most common. Zeolitic supports, especially the large pore faujasites such as USY, can additionally or alternately be used. Suitable hydrocracking conditions can include a temperature from about 200° C. to about 450° C., a hydrogen partial pressure from about 70 psig (about 0.5 MPag) to about 4350 psig (about 30 MPag), and an LHSV from about 0.05 $hr^{-1}$ to about 10 $hr^{-1}$.

Sometimes, the amount of treat gas delivered to the hydrocracking stage can be based on the stoichiometric consumption of hydrogen in the stage. Thus, in one embodiment, the treat gas rate for a hydrotreatment stage can be from about two to about fifteen times the amount of hydrogen consumed per barrel of fresh feed in the stage. A typical hydrocracking stage can consume from about 50 scf/bbl (about 8.5 $Nm^3/m^3$) to about 1000 scf/bbl (about 170 $Nm^3/m^3$) of hydrogen, depending on various factors including, but not limited to, the nature of the feed being hydrocracked. Thus, in such an embodiment, the treat gas rate can be from about 100 scf/bbl (about 17 $Nm^3/m^3$) to about 15000 scf/bbl (about 2540 $Nm^3/m^3$). In one preferred embodiment, the treat gas rate can be from about four to about five times the amount of hydrogen consumed. Note that the above treat gas rates refer to the rate of hydrogen flow. If hydrogen is delivered as part of a gas stream having less than 100% hydrogen, the treat gas rate for the overall gas stream can be proportionally higher.

Hydroprocessing in a Reactor with a Continuous Liquid Phase Environment

One option for hydroprocessing a feedstock can be to conduct the reactions in a reactor in which the liquid phase represents the continuous phase in the reactor. Traditionally, hydroprocessing has been conducted in trickle-bed reactors where an excess of gas results in a continuous gas phase in the reactor. In a liquid-continuous reactor, the feedstock can be exposed to one or more beds of catalyst. The reactor can contain a dewaxing catalyst, which can be used alone or in conjunction with other types of catalysts, such as those suitable for hydrotreating (e.g., hydrodenitrogenation, hydrodeoxygenation, and/or hydrodesulfurization), hydrocracking, and/or aromatics saturation. The liquid can enter from the top or upper portions of the reactor and can flow downward through the reactor. This downward liquid flow can assist in allowing the catalyst to remain in place in the catalyst bed.

A hydroprocessing process can typically involve exposing a feed to a catalyst in the presence of hydrogen. Without being bound by any particular theory, in a conventional trickle-bed reactor, the reactor can be operated so that three "phases" are present in the reactor. The hydroprocessing catalyst corresponds to the solid phase. Another substantial portion of the reactor volume is occupied by a gas phase, typically including hydrogen, optionally some diluent gases, and other gases such as contaminant gases that can form during hydroprocessing. The hydrogen gas in the gas phase is typically present in substantial excess relative to the amount required for the hydroprocessing reaction. In a conventional trickle-bed reactor, the solid hydroprocessing catalyst and the gas phase can occupy at least about 80% of the reactor volume, for example at least about 85% or at least about 90%. The third "phase" can correspond to the liquid feedstock. In a conventional trickle-bed reactor, the feedstock may only occupy a small portion of the volume, such as less than about 20%, for example less than about 10% or less than about 5%. As a result, the liquid feedstock may not form a continuous phase. Instead, the liquid "phase" may include, for example, thin films of feedstock that coat the hydroprocessing catalyst particles.

Without being bound by any particular theory, a liquid-continuous reactor provides a different type of processing environment as compared to a trickle-bed reactor. In a liquid-continuous reactor, the reaction zone can be primarily composed of two phases. One phase can be a solid phase corresponding to the hydroprocessing catalyst. The second phase can be a liquid phase corresponding to the feedstock, which can be present as a continuous phase in a liquid-continuous reactor. In an embodiment, the hydrogen that will be consumed during the hydroprocessing reaction can be dissolved in the liquid phase. Depending on the quantity of hydrogen used, a portion of the hydrogen could also be in the form of bubbles of hydrogen in the liquid, in which case it would be assumed that the hydrogen was dissolved in the liquid phase at approximately the solubility limit (i.e., the liquid phase can be saturated with hydrogen, but "saturated" is meant here physically rather than chemically; in the context of solubility of gas in liquid, as used herein, the phrase "approximately the solubility limit" should be understood to mean a concentration corresponding to at least 85% of the solubility limit, preferably to at least 90% of the solubility limit, for example to at least 95% of the solubility limit or to at least 99% of the solubility limit, which can, of course, include super-saturated solutions, that may correspond to up to 115% of the solubility limit, preferably to up to 110% of the solubility limit, for example to up to 105% of the solubility limit). Thus, the gas phase hydrogen would correspond to hydrogen that is in addition to the hydrogen dissolved in the liquid phase. In practical embodiments, hydrogen dissolved in the liquid phase can be depleted as the reactions progress in/through the liquid-continuous reactor. In such embodiments, hydrogen originally present in the form of gaseous bubbles can dissolve into the liquid phase to resaturate the liquid phase and provide additional hydrogen for reaction. In various embodiments, the volume occupied by a gas phase in the liquid-continuous reactor can be less than about 10% of the reactor volume, or less than about 5%.

The liquid feed to the dewaxing reactor can be mixed (e.g., well mixed) with a hydrogen-containing treat gas. The hydrogen-containing treat gas can contain at least about 50 vol % hydrogen, for example at least about 80 vol %, at least about 90 vol %, at least about 95 vol %, or at least about 99 vol % hydrogen. Excess gas can be vented from the mixture before it enters the reactor, and/or excess gas can be vented directly from the reactor. The liquid level in the reactor can be controlled so that the catalyst in the reactor is substantially (e.g., completely) wetted.

In some embodiments, the hydroprocessing reactions in a bed, stage, and/or reactor can require more hydrogen than can be dissolved in the liquid phase. In such embodiments, one or more techniques can be used to provide additional hydrogen for the hydroprocessing reaction. One option can be to recycle a portion of the product from the reactor. A recycled portion of product has already passed through a hydroprocessing stage, and therefore will likely have a reduced hydrogen consumption as it passes through the hydroprocessing stage again. Additionally or alternately, the solubility of the recycled feed can be higher than a comparable unprocessed feed. As a result, including a portion of recycled product with fresh feed can increase the amount of hydrogen available for reaction with the fresh feed.

Additionally or alternately, additional streams of hydrogen can be introduced into a reactor directly. One or more additional hydrogen streams can be introduced at any convenient location in a reactor. The additional hydrogen streams can include a stream of make-up hydrogen, a stream of recycled hydrogen, any other convenient hydrogen-containing stream, or a combination thereof. In some embodiments, both product recycle and injection of additional hydrogen streams along the axial dimension of the reactor can be used to provide sufficient hydrogen for a reaction.

In embodiments involving recycle of hydrocracked and/or dewaxed product for use as part of the input to the dewaxing stage, the ratio of the amount by volume of product recycle to the amount of fresh feed into the dewaxing stage can be at least about 0.33:1, for example at least about 0.5:1, at least about 1:1, or at least about 1.5:1. Additionally or alternately, the ratio of the amount by volume of product recycle to the amount of fresh feed can be about 4:1 or less, for example about 3:1 or less, about 2.5:1 or less, or about 2:1 or less.

Reaction Conditions—Continuous Liquid Phase Environment

In various embodiments, one or more types of different hydroprocessing stages can be provided in a continuous liquid phase environment. A hydroprocessing stage in a continuous liquid phase environment can be a hydrotreating stage, a hydrocracking stage, a catalytic dewaxing stage, a hydrofinishing or aromatics saturation stage, a ring opening stage, or a combination thereof.

In an embodiment, a hydrocracking stage in a continuous liquid phase environment can employ the catalysts and reaction conditions similar to those described above for a continuous gas phase environment, with the exception of treat gas rate. Additionally or alternately, and similarly, a hydrotreatment stage in a continuous liquid phase environment can employ catalysts and reaction conditions consistent with those described above for a continuous gas phase environment, with the exception of treat gas rate. In an alternative embodiment, a hydrotreatment stage in continuous liquid phase environment can include a milder set of effective reaction conditions.

The catalyst in a hydrotreatment stage can be a catalyst composed of a Group VIB metal and/or a Group VIII metal, optionally on a support such as a refractory support. Suitable metals can include, but are not limited to, nickel, molybdenum, tungsten, and combinations thereof. When present, suitable supports and/or fillers can include, but are not limited to, silica, silica-alumina, alumina, titania, zirconia, and combinations thereof. The reaction conditions can comprise conditions suitable for reducing the sulfur content of the feedstream, or at least the diesel portion of the feedstream, to about 30 wppm or less, preferably to about 20 wppm or less, for example to about 15 wppm or less or to about 10 wppm or less. Additionally or alternately, the reaction conditions can include an LHSV from about 0.5 hr$^{-1}$ to about 1.5 hr$^{-1}$ (e.g. from about 0.9 hr$^{-1}$ to about 1.1 hr$^{-1}$), a total pressure from about 250 psig (about 1.7 MPag) to about 800 psig (about 5.5 MPag) (e.g., from about 350 psig (about 2.4 MPag) to about 600 psig (about 4.1 MPag)), and a temperature from about 550° F. (about 288° C.) to about 750° F. (about 399° C.) (from about 625° F. (about 329° C.) to about 675° F. (about 357° C.)).

A dewaxing stage in a continuous liquid phase environment can be operated under effective dewaxing conditions. Effective dewaxing temperatures can be at least about 500° F. (about 260° C.), for example at least about 550° F. (about 288° C.), at least about 600° F. (about 316° C.), or at least about 650° F. (about 343° C.). Additionally or alternately, the temperature can be about 750° F. (about 399° C.) or less, for example about 700° F. (about 371° C.) or less or about 650° F. (about 343° C.) or less. Effective dewaxing pressures can be at least about 400 psig (about 2.8 MPag), for example at least about 500 psig (about 3.4 MPag), at least about 750 psig (about 5.2 MPag), or at least about 1000 psig (about 6.9 MPag). Additionally or alternately, the pressure can be about 1500 psig (about 10.3 MPag) or less, for example about 1200 psig (about 8.2 MPag) or less, about 1000 psig (about 6.9 MPag) or less, or about 800 psig (about 5.5 MPag) or less. Effective dewaxing LHSVs can be at least about 0.1 hr$^{-1}$, for example at least about 0.2 hr$^{-1}$, at least about 0.5 hr$^{-1}$, at least about 1.0 hr$^{-1}$, or at least about 1.5 hr$^{-1}$. Additionally or alternately, the LHSV can be about 10.0 hr$^{-1}$ or less, for example about 5.0 hr$^{-1}$ or less, about 3.0 hr$^{-1}$ or less, or about 2.0 hr$^{-1}$ or less. Further additionally or alternately, the temperature, pressure, and LHSV for a liquid-continuous reactor can comprise conditions suitable for use in a trickle bed reactor.

The catalyst in a hydrocracking stage or dewaxing stage can be a hydrocracking catalyst as described above. Additionally or alternately, a dewaxing catalyst can be selected. Dewaxing catalysts can comprise molecular sieves such as crystalline aluminosilicates (zeolites) or silicoaluminophosphates (SAPOs). Additionally or alternately, the molecular sieve can be a 1-D or 3-D molecular sieve, for example a 10-member ring 1-D molecular sieve. Examples of molecular sieves useful for dewaxing can include, but are not limited to ZSM-48, ZSM-22, ZSM-23, ZSM-35, zeolite Beta, USY, ZSM-5, and combinations thereof. In a preferred embodiment, the molecular sieve can comprise ZSM-22, ZSM-23, ZSM-35, ZSM-48, and combinations thereof, particularly ZSM-48 and/or ZSM-23. Optionally, the dewaxing catalyst can include a binder, such as alumina, titania, silica, silica-alumina, zirconia, or a combination thereof, for example alumina and/or titania, or one or more of titania, silica, and zirconia. Additionally or alternately, a portion of the catalyst in the dewaxing reactor can comprise or be a hydrotreatment catalyst.

One feature of molecular sieves that can impact the activity of the molecular sieve includes the ratio of silica to alumina (Si/Al$_2$) in the molecular sieve. For instance, the molecular sieve can have a silica to alumina ratio of about 200:1 or less, for example about 120:1 or less, about 100:1 or less, about 90:1 or less, or about 75:1 or less. Additionally or alternately, the molecular sieve can have a silica to alumina ratio of at least about 30:1, for example at least about 50:1 or at least about 65:1.

The dewaxing catalyst can also typically include a metal hydrogenation component, such as a Group VIII metal. Suitable Group VIII metals can include Pt, Pd, Ni, or combinations thereof. The dewaxing catalyst can include at least about 0.1 wt % of the Group VIII metal(s), for example at least about 0.3 wt %, at least about 0.5 wt %, at least about 1.0 wt %, at least about 2.5 wt %, or at least about 5.0 wt %. Additionally or alternately, the dewaxing catalyst can include about 10.0 wt % or less of the Group VIII metal(s), for example about 5.0 wt % or less, about 2.5 wt % or less, about 1.5 wt % or less, or about 1.0 wt % or less.

In some embodiments, the dewaxing catalyst can include as an additional hydrogenation component at least one Group VIB metal, such as W and/or Mo. Such Group VIB metals can typically be used in conjunction with the at least one Group VIII metal, such as Ni and/or Co. An example of such an embodiment could be a dewaxing catalyst that includes NiW, NiMo, or NiMoW. When present, the dewaxing catalyst can include at least about 0.5 wt % of the Group VIB metal(s), for example at least about 1.0 wt %, at least about 2.5 wt %, or at least about 5.0 wt %. Additionally or alternately, the dewaxing catalyst can include about 20.0 wt % or less of the Group VIB metal(s), for example about 15.0 wt % or less, about 10.0 wt % or less, about 5.0 wt % or less, or about 1.0 wt % or less. Where the dewaxing catalyst contains only Group VIII metals, however, Pt and/or Pd is(are) the preferred Group VIII metal(s).

In some embodiments, a hydrofinishing or aromatic saturation stage having a continuous liquid phase environment can also be provided. Hydrofinishing catalysts can include catalysts containing Group VIB metals, Group VIII metals, and mixtures thereof. In an embodiment, the sulfide of at least one of the metals can have a relatively strong hydrogenation function. Alternately, the hydrofinishing catalyst can include a Group VIII noble metal, such as Pt and/or Pd. These catalysts may include bulk metal catalysts wherein the amount of metal is about 50 wt % or greater based on catalyst. When the catalysts are supported catalysts, suitable metal oxide supports can include low acidic oxides such as silica, alumina, silica-aluminas, titania, and combinations thereof, particularly comprising alumina. Preferred hydrofinishing catalysts for aromatic saturation can comprise at least one metal whose sulfide exhibits a relatively strong hydrogenation function on a porous support, which can include amorphous or crystalline oxide materials such as alumina, silica, and silica-alumina. Additionally or alternately, when present, the support materials may be modified, such as by halogenation, or in particular fluorination. The metal content of the catalyst can often be as high as about 20 wt % for non-noble metals. Additionally or alternately, the hydrofinishing catalyst can include a crystalline material belonging to the M41S class or family of catalysts, which are mesoporous materials having relatively high silica content, including but not limited to MCM-41, MCM-48, MCM-50, and combinations thereof (particularly comprising MCM-41).

Hydrofinishing conditions can include a temperature from about 125° C. to about 425° C., for example from about 180° C. to about 280° C., a total pressure from about 500 psig (about 3.4 MPag) to about 3000 psig (about 20.7 MPag), for example from about 1500 psig (about 10.3 MPag) to about 2500 psig (about 17.2 MPag), and an LHSV from about 0.1 hr$^{-1}$ to about 5 hr$^{-1}$, for example from about 0.5 hr$^{-1}$ to about 1.5 hr$^{-1}$.

When there is a ring opening stage in a continuous liquid environment, a ring opening catalyst can advantageously comprise or be a supported catalyst containing a precious metal, such as rhenium and/or rhodium. A ring opening stage can be operated under effective hydrotreating conditions and/or under effective hydrofinishing conditions.

In a reactor with a continuous liquid phase environment, the treat gas rate can be selected to be comparable to the hydrogen consumption of the feed for performing the desired type of hydroprocessing, as the hydrogen need of a feed can vary, depending on the type of feed and the nature of the hydroprocessing stage. The treat gas rate can be at least about 1.0 times the hydrogen need, for example at least about 1.1 times the hydrogen need or at least about 1.2 times the hydrogen need. For a hydrotreatment stage in a continuous liquid phase environment, the hydrogen need for the fresh feed portion of the input to the reactor can be from about 25 scf/bbl (about 4.2 $Nm^3/m^3$) to about 250 scf/bbl (about 42 $Nm^3/m^3$). Here, the "fresh feed" portion refers to the portion of the input that has not previously passed through the same processing stage, which is in contrast to a recycled feed portion, which has previously passed through the same processing stage. For a hydrocracking stage in the second reactor, the hydrogen need for the fresh feed portion of the input can be at least about 50 scf/bbl (about 8.5 $Nm^3/m^3$), for example at least about 100 scf/bbl (about 17 $Nm^3/m^3$) or at least about 200 scf/bbl (about 34 $Nm^3/m^3$). Additionally or alternately, the hydrogen need can be about 1000 scf/bbl (about 170 $Nm^3/m^3$) or less, for example about 400 scf/bbl (about 68 $Nm^3/m^3$) or less or about 600 scf/bbl (about 100 $Nm^3/m^3$) or less. For a dewaxing stage, the hydrogen need can be from about 50 scf/bbl (about 8.5 $Nm^3/m^3$) to about 400 scf/bbl (about 68 $Nm^3/m^3$).

The hydrogen need or consumption can additionally or alternately be expressed relative to the total input to the reactor, which can include recycled portions of input. The hydrogen need in a stage, relative to the total input to the reactor stage, can be at least about 10 scf/bbl (about 1.7 $Nm^3/m^3$), for example at least about 25 scf/bbl (about 4.2 $Nm^3/m^3$), or at least about 50 scf/bbl (about 8.4 $Nm^3/m^3$), or at least about 100 scf/bbl (about 17 $Nm^3/m^3$). Additionally or alternately, the hydrogen need relative to the total input can be about 500 scf/bbl (about 84 $m^3/m^3$) or less, for example about 250 scf/bbl (about 42 $m^3/m^3$) or less or about 200 scf/bbl (about 34 $m^3/m^3$) or less.

The liquid feed to a hydroprocessing stage in a continuous liquid phase environment can be well mixed with hydrogen-rich treat gas. Excess gas can be vented from the mixture before it enters the reactor, or excess gas can be vented directly from the reactor. The liquid level in the reactor can be controlled so that the catalyst in the reactor is substantially (e.g., completely) wetted.

In some embodiments, the hydroprocessing reactions in a bed, stage, and/or reactor can require more hydrogen than can be dissolved in the liquid phase. In such embodiments, one or a combination of the following techniques can be used to provide additional hydrogen for the hydroprocessing reaction. One option can be to recycle a portion of the product from the reactor that has already passed through a hydroprocessing stage, and therefore should have a reduced hydrogen consumption as it passes through another hydroprocessing stage. Additionally or alternately, the solubility of the recycled feed can be higher than a comparable unprocessed feed. As a result, including a portion of recycled product with fresh feed can increase the amount of hydrogen available for reaction with the fresh feed. Another option can be to introduce additional streams of hydrogen into a reactor directly. One or more additional hydrogen streams can be introduced at any convenient location in a reactor. The additional hydrogen streams can include a stream of make-up hydrogen, a stream of recycled hydrogen, any other convenient hydrogen-containing stream, or a combination thereof. In some embodiments, both product recycle and injection of additional hydrogen streams along the axial dimension of the reactor can be used to provide sufficient/additional hydrogen for a reaction.

Reaction System

A divided wall column can be employed in any reaction system that includes a fractionator. One example of a suitable reaction system includes two reactors and a divided wall column. In such an embodiment, a feedstock can be passed into a first reactor. The first reactor can include one or more stages for hydrotreatment, hydrocracking, and/or another type of conversion process.

The effluent from the first reactor can then be passed to a divided wall column. The effluent can enter the divided wall column in a first separated volume. The divided wall column can fractionate the first effluent into a bottoms portion, optionally but preferably another portion that leaves the divided wall column from the separated volume, and a lighter portion that enters a common volume in the divided wall column. In an embodiment where the bottoms portion corresponds to a feed that boils in the vacuum gas oil range, such as a bottoms portion suitable for use as a feed to a fluid catalytic cracking process, the optional additional portion that leaves the divided wall column from the separated volume can comprise or be a diesel boiling range fraction. More generally, the optional additional portion that can leave the divided wall column from the separated volume can be any distinct cut that has a lower boiling point than the bottoms but that has a higher boiling point than the portion that enters the common volume. Thus, in various embodiments, the optional additional portion could comprise/be a diesel cut, an arctic diesel cut, a kerosene cut, a heavy naphtha cut, a light gas oil cut, or the like, or a combination thereof, depending upon the nature of the bottoms.

At least a portion of the bottoms from the first (separated) volume of the divided wall column can then be passed to a second reactor. Optionally, at least a portion of any optional additional cuts that exit from the first volume can also be passed to the second reactor. The second reactor can include one or more stages for performing hydrotreatment, hydrocracking, catalytic isomerization, hydrofinishing, and/or another desired type of hydroprocessing. In some embodiments, the goal of the hydroprocessing in the second reactor can be to improve at least one property of the effluent from the second reactor, such as reducing the sulfur level, improving the pour point, improving the cloud point, or the like, or a combination thereof.

The effluent from the second reactor can then be passed to a second separated volume in the divided wall column for fractionation. The second volume can fractionate the effluent from the second reactor into at least a bottoms portion, optionally but preferably another portion that exits from the second volume, and a portion that enters the common volume. In an embodiment, all portions of fractionated effluents that enter the common volume can be fractionated into one or more products, such as a kerosene cut, one or more types of naphtha cuts, and/or light ends. Preferably, the bottoms cut and/or optional additional portion exiting from the second volume can specifically not be recycled to the first reactor, can specifically not be recycled to the second reactor, or more preferably both. These cuts can, however, undergo further processing. For example, in an embodiment where the second reactor includes a catalytic isomerization stage, the bottoms cut from the second volume can include a vacuum gas oil feed suitable for further processing as a lubricant feed.

Additional/Alternate Embodiments

Additionally or alternately, the invention can include one or more of the following embodiments.

Embodiment 1

A method for producing low sulfur distillate products, comprising: hydrotreating a feedstock under first effective hydrotreating conditions; fractionating the hydrotreated feedstock in a first volume of a divided wall column fractionator to produce at least a first product fraction, a first bottoms fraction, and a first common fraction that is passed to an upper undivided volume of the fractionator; dissolving hydrogen in at least a portion of the first bottoms fraction to approximately the solubility limit; hydrocracking the portion of the first bottoms fraction under effective hydrocracking conditions in a hydrocracking stage having a continuous liquid environment; and fractionating the hydrocracked first bottoms fraction in a second volume of the divided wall column fractionator to produce at least a second product fraction, a third product fraction, and a second common fraction that is passed to the upper undivided volume of the fractionator, wherein the second product fraction has at least one improved property relative to the first product fraction and the third product fraction has at least one improved property relative to the bottoms fraction.

Embodiment 2

A method for producing low sulfur distillate products, comprising: hydrotreating a feedstock under effective hydrotreating conditions; hydrocracking the hydrotreated feedstock in a first hydrocracking stage under first effective hydrocracking conditions; fractionating the hydrocracked feedstock in a first volume of a divided wall column fractionator to produce at least a first diesel product fraction and a first bottoms fraction; hydrocracking a portion of the bottoms fraction in a second hydrocracking stage having a continuous liquid environment under second effective hydrocracking conditions; dewaxing the hydrocracked portion of the first bottoms fraction in a dewaxing stage having a continuous liquid environment under effective dewaxing conditions; and fractionating the hydrocracked, dewaxed bottoms fraction in a second volume of the divided wall column fractionator to produce at least a second diesel product fraction and a second bottoms fraction, wherein the second diesel product fraction has at least one improved cold flow property relative to the first diesel product fraction, and the second bottoms fraction has at least one improved cold flow property relative to the first bottoms fraction.

Embodiment 3

The method of embodiment 1, further comprising hydrocracking the hydrotreated feed under effective hydrocracking conditions in a continuous gas phase environment prior to passing the hydrotreated feed to the first volume of the divided wall column.

Embodiment 4

The method of any one of the previous embodiments, wherein the effective hydrocracking conditions, first effective hydrocracking conditions, the second effective hydrocracking conditions, or any combination thereof include a temperature from about 200° C. to about 450° C., a total pressure from about 5 barg (about 0.5 MPag) to about 300 barg (about 30 MPag), an LHSV from about 0.05 hr$^{-1}$ to about 10 hr$^{-1}$, and, when the relevant hydrocracking stage is in a continuous gas phase environment, a hydrogen treat gas rate from about two times to about fifteen times the hydrogen consumed during the hydrocracking.

Embodiment 5

The method of any one of the previous embodiments, wherein the effective hydrotreating conditions include an LHSV from about 0.3 hr$^{-1}$ to about 5.0 hr$^{-1}$, a total pressure from about 500 psig (about 3.4 MPag) to about 3000 psig (about 20.7 MPag), a temperature from about 650° F. (about 343° C.) to about 800° F. (about 427° C.), and, when the hydrotreating stage is in a continuous gas phase environment, a treat gas rate that provides an amount of hydrogen from about two times to about five times the hydrogen consumed during the hydrotreating.

Embodiment 6

The method of embodiment 5, wherein the portion of the first bottoms fraction is mixed with at least one of a diesel fraction from the first volume, a recycled diesel fraction from the second volume, and a recycled bottoms fraction from the second volume.

Embodiment 7

The method of any one of the previous embodiments, wherein the sulfur content of the second product fraction is lower than the sulfur content of the first product fraction, and wherein the sulfur content of the third product fraction is lower than the sulfur content of the first bottoms fraction.

Embodiment 8

The method of any one of the previous embodiments, wherein the height of the dividing wall is selected so that the second product fraction contains about 1 wt % or less of material corresponding to the first product fraction.

Embodiment 9

The method of any one of embodiments 1 and 3-8, further comprising hydroprocessing the hydrocracked first bottoms fraction under effective hydroprocessing conditions in a continuous liquid phase environment, the hydroprocessing comprising hydrotreatment, catalytic dewaxing, ring-opening, and/or hydrofinishing.

Embodiment 10

The method of any one of embodiments 2 and 4-9, wherein the effective catalytic dewaxing conditions include a temperature from about 280° C. to about 380° C., a hydrogen partial pressure from about 300 psig (about 2.1 MPag) to about 3000 psig (about 20.7 MPag), and an LHSV from about 0.1 hr$^{-1}$ to about 5.0 hr$^{-1}$.

Embodiment 11

The method of any one of embodiments 2 and 4-10, wherein the second diesel fraction and the second bottoms fraction are not recycled to the dewaxing stage, and wherein said hydrocracking of the bottoms fraction further comprises hydrocracking of a portion of the first diesel fraction.

Embodiment 12

The method of any one of the previous embodiments, wherein the cloud point of the second product fraction is at least about 10° C. less than the cloud point of the first product fraction.

Embodiment 13

The method of any one of the previous embodiments, wherein the sulfur content of the first product fraction is about 15 wppm or less.

Embodiment 14

The method of any one of the previous embodiments, wherein the pour point of the second bottoms fraction is at least about 10° C. less than the pour point of the first bottoms fraction.

EXAMPLES

Example 1

Configuration for Low Sulfur Diesel Production

Figure 1:
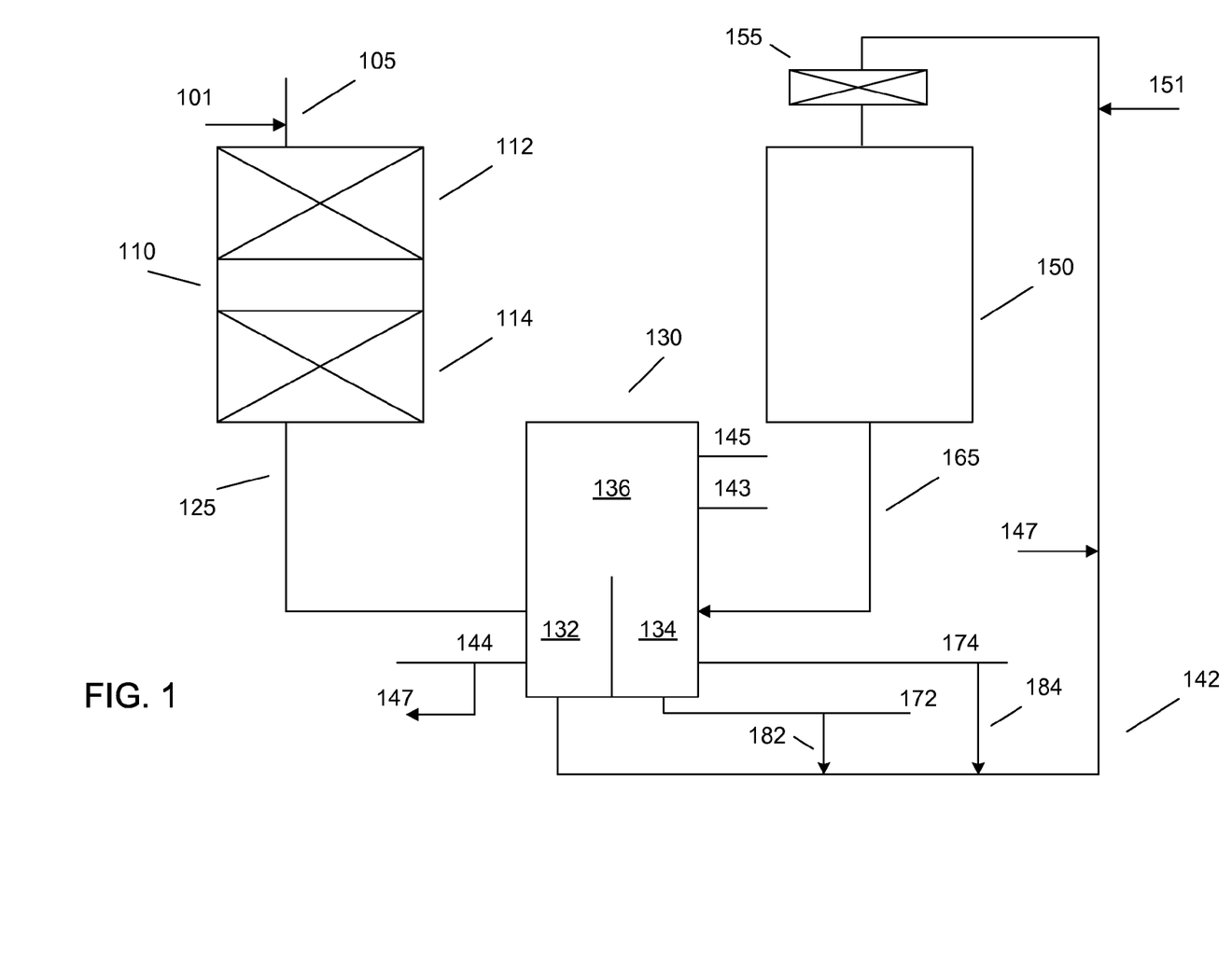
FIG. 1 schematically shows a reaction system for performing a process according to an embodiment of the invention.

In this Example, a divided wall column can be used as a fractionator in a multiple reactor reaction system for producing low sulfur diesel. FIG. 1 shows a schematic of this type of system. In the embodiment shown in FIG. 1, reactor 110 can include one or more stages for hydrotreatment and/or hydrocracking of a feed in a continuous gas phase environment. FIG. 1 shows a reactor 110 that includes one hydrotreatment stage 112 and one hydrocracking stage 114. However, any other convenient combination of stages can be included in reactor 110. For example, reactor 110 can have one hydrotreating stage, two hydrotreating stages, two hydrotreating stages and one hydrocracking stage, or any other convenient combination. Note that FIG. 1 shows a reactor 110 including multiple stages. In another embodiment, multiple serial reactors can be used in place of a single reactor with multiple stages.

In a hydrotreatment stage, a feed 105 can be exposed to a hydrotreatment catalyst under effective hydrotreatment conditions. A hydrogen stream 101 can also be introduced into the reactor, either with feed 105 or as a separate input. The reactor 110 can also include one or more hydrocracking stages, for processing a hydrotreated feed under effective hydrocracking conditions.

The effluent 125 from reactor 110 can then be passed to a first volume 132 of divided wall column 130. The effluent 125 can be fractionated into at least three portions. In the first volume 132, a bottoms cut 142 and a diesel cut 144 can be produced. Lighter portions of effluent 125 can travel up in the divided wall column to enter common portion 136. Common portion 136 can also separate out one or more cuts, such as kerosene cut 143 and naphtha cut 145. Note that the entire effluent 125 is shown as being passed to first volume 132. Additionally or alternatively, one or more other separation devices, such as flash separators or strippers, could be used prior to divided wall column 130, in order to remove gas phase or other low boiling products from effluent 125.

At least a portion of bottoms cut 142 can then be passed to a second reactor 150. Optionally, a portion of bottoms cut 142 can be used as a feed to another process, such as a feed to an FCC reactor. In the embodiment shown in FIG. 1, a portion of diesel cut 144 can also optionally be passed into second reactor 150, as indicated by stream 147. For ease of viewing in FIG. 1, the full flow path of stream 147 is not shown. Alternately, the portion of bottoms cut 142, a portion of diesel cut 144, or another portion can be the only portion from first volume 132 delivered as an input to second reactor 150. A recycled portion of second diesel output 184 and/or second bottoms fraction 182 can optionally be added to the input for the second reactor. These potential input streams can be combined in any convenient manner. For example, the input to the reactor with the continuous liquid phase environment can be composed of bottoms cut 142 and diesel cut 144. This type of configuration can avoid excessive recycling of hydrocracked product. Another possibility can be to include bottoms cut 142, recycled second diesel output 184, and recycled second bottoms fraction 182. In this configuration, the diesel output from the first volume 132 can be increased while using one or both of the recycled fractions 182 and/or 184 to maintain the total hydrogen need of the input to the second reactor at a manageable level. Note that recycled portions 182 and 184 do not constitute fresh feed to the reactor 150. In the embodiment shown in FIG. 1, second reactor 150 can include a single hydrocracking stage in a continuous liquid phase environment. Additionally or alternatively, second reactor 150 could include one or more hydrotreatment stages, hydrocracking stages, dewaxing or isomerization stages, hydrofinishing stages, or a combination thereof.

Prior to entering reactor 150, hydrogen can be dissolved in the input to the reactor at approximately the solubility limit. Optionally, additional hydrogen can be present as undissolved gas. This can be accomplished, for example, by incorporating a hydrogen stream 151 into the input flow, e.g., using static mixer 155.

The effluent 165 from second reactor 150 can then be passed to a second volume 134 of divided wall column 130. Divided wall column 130 can fractionate effluent 165 into at least bottoms fraction 172 and optionally but preferably product (diesel) fraction 174, as well as lighter portions which can travel up to common volume 136. When product fraction 174 is a diesel fraction, bottoms fraction 172 can include unconverted vacuum gas oil that may be suitable as a feed to another process, such as a fluid catalytic cracking process. In certain situations, particularly where there is little or no product fraction 174, bottoms fraction 172 can comprise a diesel fraction. The diesel fraction can advantageously be suitable for use as a low sulfur diesel product, preferably as an ultra low sulfur diesel product. In an embodiment where the diesel fraction is an ultra low sulfur diesel product, the dividing wall 135 of the divided wall column 130 can keep the relatively higher sulfur content products in first volume 132 separate from the relatively lower sulfur products in second volume 134. Note that the entire effluent 165 is shown as being passed to second volume 134. Additionally or alternatively, one or more other separation devices, such as flash separators or strippers, could be used prior to divided wall column 130, in order to remove gas phase or other low boiling products.

It should be noted that recycling of bottoms fraction 172 and/or diesel fraction 174 to second reactor 150 is optional. In some embodiments, only streams 142 and/or 147 exiting first volume 132 are used in FIG. 1 as feed to second reactor 150. Such an embodiment can thus avoid the potential for excessive recycling of bottoms portions from the fractionator, leading to reduced production of polynuclear aromatics.

In an embodiment such as FIG. 1, if desired, at least two different grades of product can be produced by each separate volume of the divided wall column. For example, the difference between a diesel product fraction from the first separate volume from the second separate volume can include a different sulfur content, a different boiling point or distillation profile, or another feature, or a combination thereof.

If the diesel product fractions differ in sulfur content, the diesel product fraction from the first separate volume can have a sulfur content advantageously greater than the sulfur content of the diesel product fraction from the second separate volume. The sulfur content of the diesel product fraction from the first separate volume can be at least about 15 wppm, for example at least about 25 wppm, at least about 50 wppm, at least about 100 wppm, or at least about 250 wppm. Additionally or alternatively, the sulfur content of the diesel product fraction from the first separate volume can be about 400 wppm or less, for example about 200 wppm or less, about 100 wppm or less, or about 50 wppm or less. Further additionally or alternatively, the sulfur content of the diesel product fraction from the second separate volume can be about 50 wppm or less, for example about 30 wppm or less, about 20 wppm or less, about 15 wppm or less, or about 10 wppm or less.

With regard to distillation profile, the separate volumes in the divided wall column can be configured to produce diesel boiling range cuts with a T5 boiling point of at least about 215° F. (about 102° C.), for example at least about 250° F. (about 121° C.), at least about 350° F. (about 177° C.), at least about 450° F. (about 232° C.), or at least about 500° F. (about 260° C.). Additionally or alternatively, the separate volumes in the divided wall column can be configured to produce diesel boiling range cuts with a T95 boiling point of about 800° F. (about 427° C.) or less, for example about 700° F. (about 371° C.) or less, about 600° F. (about 316° C.) or less, about 550° F. (about 288° C.) or less, about 500° F. (about 260° C.) or less, or about 450° F. (about 232° C.) or less. Note that, if more than one diesel boiling range stream is produced in a separate volume, the above T5 and T95 values can be used to individually characterize each of the streams or to collectively characterize both of the streams.

When multiple diesel boiling range streams are produced using divided wall column according to the invention, the difference in T5 boiling point for a diesel boiling range stream from the first separate volume relative to the second separate volume can be at least about 5° C., for example at least about 10° C., at least about 25° C., or at least about 50° C. Additionally or alternatively, the difference in T95 boiling point for a diesel boiling range stream from the first separate volume relative to the second separate volume can be at least about 5° C., for example at least about 10° C., at least about 25° C., or at least about 50° C.

Each separate volume can additionally or alternatively produce at least one higher boiling range stream, such as a higher boiling diesel range stream and/or a gas oil boiling range stream. The bottoms from each separate volume can typically be the higher boiling range stream, and, in some embodiments, multiple diesel boiling range and/or gas oil boiling range streams can be produced from each separate volume. The bottoms stream (or other additional diesel or higher boiling range streams) from each separate volume can differ based on sulfur content, distillation profile, and/or one or more other features, or a combination thereof.

Additionally or alternatively, with regard to distillation profile, the separate volumes in the divided wall column can be configured to produce gas oil boiling range cuts with a T5 boiling point of at least about 550° F. (about 288° C.), for example at least about 600° F. (about 316° C.), at least about 700° F. (about 371° C.), or at least about 800° F. (about 427° C.). Additionally or alternatively, the separate volumes in the divided wall column can be configured to produce gas oil boiling range cuts with a T95 boiling point of about 1100° F. (about 593° C.) or less, for example about 1000° F. (about 538° C.) or less, about 900° F. (about 482° C.) or less, or about 800° F. (about 427° C.) or less.

When multiple gas oil boiling range streams are produced using divided wall column according to the invention, the difference in T5 boiling point for a gas oil boiling range stream from the first separate volume relative to the second separate volume can be at least about 5° C., for example at least about 10° C., at least about 25° C., or at least about 50° C. Additionally or alternatively, the difference in T95 boiling point for a gas oil boiling range stream from the first separate volume relative to the second separate volume can be at least about 5° C., for example at least about 10° C., at least about 25° C., at least about 50° C., or at least about 100° C.

One or more streams can be removed/formed from the common volume of the divided wall column, including but not limited to, a naphtha boiling range stream, a kerosene boiling range stream, a light ends stream ($C_{4-}$ hydrocarbons), and combinations thereof. Separate streams of hydrogen, hydrogen sulfide, ammonia, and/or other non-condensable gases can also be produced, or these components can leave the common volume as part of another stream, such as a light ends stream. A kerosene boiling range stream can have a T5 boiling point of at least about 200° F. (about 93° C.), for example at least about 215° F. (about 102° C.) or at least about 250° F. (about 121° C.). A kerosene boiling range stream can additionally or alternatively have a T95 boiling point of about 450° F. (about 232° C.) or less, for example about 400° F. (about 204° C.) or less or about 350° F. (about 177° C.) or less. A naphtha boiling range stream can have a T5 boiling point of at least about 85° F. (about 29° C.), for example at least about 100° F. (about 38° C.) or at least about 120° F. (about 49° C.). A naphtha boiling range stream can additionally or alternately have a T95 boiling point of about 250° F. (about 121° C.) or less, for example about 215° F. (about 102° C.) or less or about 200° F. (about 93° C.) or less.

Example 2

Figure 2:
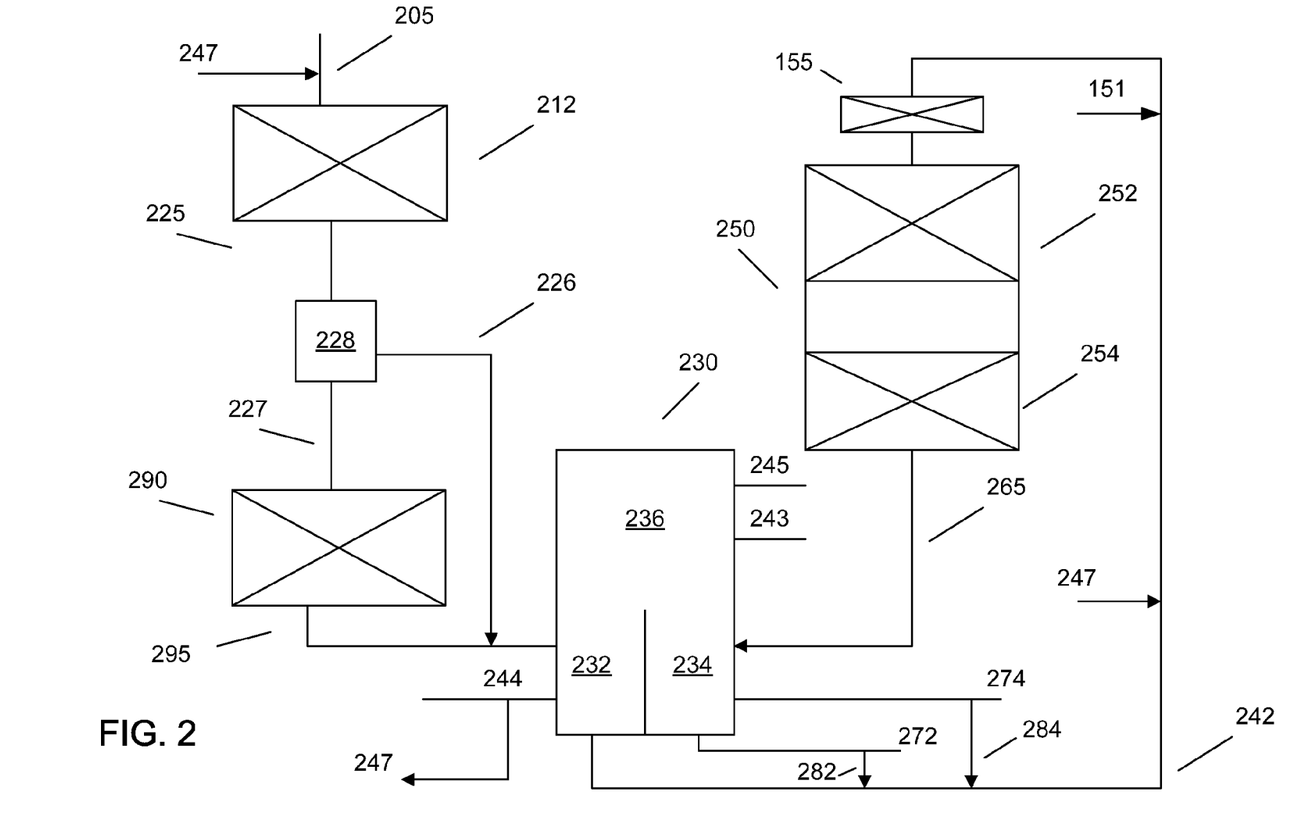
FIG. 2 schematically shows a reaction system for performing a process according to an embodiment of the invention.

Configuration Including Stage with Continuous Liquid Phase Environment Prior to the Divided Wall Column In this Example, a divided wall column can be used as a fractionator in a two reactor reaction system for producing low sulfur diesel. FIG. 2 shows a schematic of a system that includes a reaction stage with a continuous liquid environment upstream from the first volume 232 of a divided wall column fractionator 230. FIG. 2 shows a reaction system that includes a hydrotreatment stage 212 having a continuous gas phase environment. However, any other convenient combination of stages that operate with a continuous gas phase environment could also be included. For example, a hydrocracking stage having a continuous gas phase environment could also be included. The reaction conditions and catalysts in hydrotreatment stage 212 can be similar to those described above for hydrotreatment stages having a continuous gas phase environment. Similarly, any additional hydrocracking stage could have reaction conditions similar to those described above.

The effluent 225 from reactor 210 can then be passed to a reactor 290 having a continuous liquid phase environment. Prior to entering reactor 290, a hot, high pressure separator 228 can be used to separate out a gas phase portion 226, so that only a liquid phase portion 227 can be passed into reactor

290. The gas phase portion 226 can be recombined with the output effluent 295 from reactor 290. Optionally, a portion of bottoms cut 242 can be separated out to form a recycled first bottoms cut stream 292 added to the input to reactor 290. The reactor 290 can include a hydrocracking stage. The hydrocracking conditions and catalyst in reactor 290 can be similar to the hydrocracking conditions and catalyst for a reaction stage in a continuous liquid environment, as described above, with the exception of the hydrogen treat gas rate, as noted herein.

The effluent 295 from reactor 290 can then be passed to a first volume 232 of divided wall column 230. The effluent 225 can be fractionated into at least three portions. In the first volume 232, a bottoms cut 242 and a diesel cut 244 can be produced. Lighter portions of effluent 225 can travel up in the divided wall column to enter common portion 236. Common portion 236 can also separate out one or more cuts, such as kerosene cut 243 and naphtha cut 245. Note that the entire effluent 295 is shown as being passed to first volume 232. Additionally or alternately, one or more other separation devices, such as flash separators or strippers, could be used prior to divided wall column 230, in order to remove gas phase or other low boiling products.

At least a portion of bottoms cut 242 and/or diesel cut 244 can then be passed to a second reactor 250. The reaction stages in reactor 250 can advantageously have a continuous liquid phase environment. Optionally, a portion of bottoms cut 242 can be used as a feed to another process, such as a feed to an FCC reactor. In the embodiment shown in FIG. 2, a portion of diesel cut 244 can also optionally be passed into second reactor 250, as indicated by stream 247. For ease of viewing in FIG. 2, the full flow path of stream 247 is not shown. Alternately, a portion of bottoms cut 242, a portion of diesel cut 244, or another portion can be the only portion from first volume 232 delivered as an input to second reactor 250. A recycled portion of second diesel output 284 and/or second bottoms fraction 282 can optionally be added to the input for the second reactor. These potential input streams can be combined in any convenient manner. For example, the input to the reactor with the continuous liquid phase environment can be composed of bottoms cut 242 and diesel cut 244. This type of configuration can avoid excessive recycling of hydrocracked product. Another possibility can be to include bottoms cut 242, recycled second diesel output 284, and recycled second bottoms fraction 282. In this configuration, the diesel output from the first volume 232 can be increased while using one or both of the recycled fractions 282 and/or 284 to maintain the total hydrogen need of the input to the second reactor at a manageable level. Note that recycled portions 282 and 284 do not constitute fresh feed to the reactor 250. In the embodiment shown in FIG. 2, second reactor 250 can include a single hydrocracking stage in a continuous liquid phase environment. Additionally or alternately, second reactor 250 could include one or more hydrotreatment stages, hydrocracking stages, dewaxing or isomerization stages, hydrofinishing stages, or a combination thereof.

In the embodiment shown in FIG. 2, second reactor 250 can include a hydrocracking stage 252 and a dewaxing stage 254. Additionally or alternately, second reactor 250 can include one or more hydrotreatment, hydrocracking, catalytic dewaxing, and/or hydrofinishing stages. In this Example, second reactor 250 contains one or more hydrocracking stages.

Prior to entering reactor 250, hydrogen can be dissolved in the input to the reactor at approximately the solubility limit. Optionally, additional hydrogen can be present as undissolved gas. This can be accomplished, for example, by incorporating a hydrogen stream 251 into the input flow, e.g., using static mixer 255.

The effluent 265 from the second reactor 250 can then be passed to a second volume 234 of the divided wall column 230. The divided wall column 230 can fractionate the effluent 265 into at least a bottoms fraction 272, optionally but preferably an arctic diesel fraction 274, and lighter portions which can travel up to common volume 236. In the embodiment shown in FIG. 2, where stage 254 is a dewaxing stage, the bottoms fraction 272 can include dewaxed vacuum gas oil suitable as a feed to another process, such as a feed for production of lubricant base stocks. In such an embodiment, optional diesel fraction 274 can be an arctic diesel fraction suitable for use as a diesel fuel in low temperature environments. Additionally or alternately, portions of arctic diesel fraction 274 can be blended with portions of diesel fraction 234.

According to FIG. 2, optionally but preferably at least two different grades of product can be produced by each separate volume of a divided wall column. For example, the difference between a fraction from a first separate volume and a second separate volume can be based on a different sulfur content for the products, a different boiling point or distillation profile, and/or another feature such as a cold flow property of the fraction, as well as combinations thereof. Potential differences between sulfur contents and distillation profiles are described above. With regard to cold flow properties, a fraction from a first separate volume can differ from a fraction from a second separate volume based on a cloud point, a pour point, and/or another cold flow property, or a combination thereof.

When a difference between the fraction from the first separate volume and the second separate volume includes cloud point, the cloud point of the fraction from the second separate volume can be at least about 5° C. less than the cloud point of the fraction from the first separate volume, for example at least about 10° C. less, at least about 15° C. less, or at least about 25° C. less. When a difference between the fraction from the first separate volume and the second separate volume includes pour point, the pour point of the fraction from the second separate volume can be at least about 5° C. less than the pour point of the fraction from the first separate volume, for example at least about 10° C. less, at least about 15° C. less, or at least about 25° C. less.

Example 3

Figure 3:
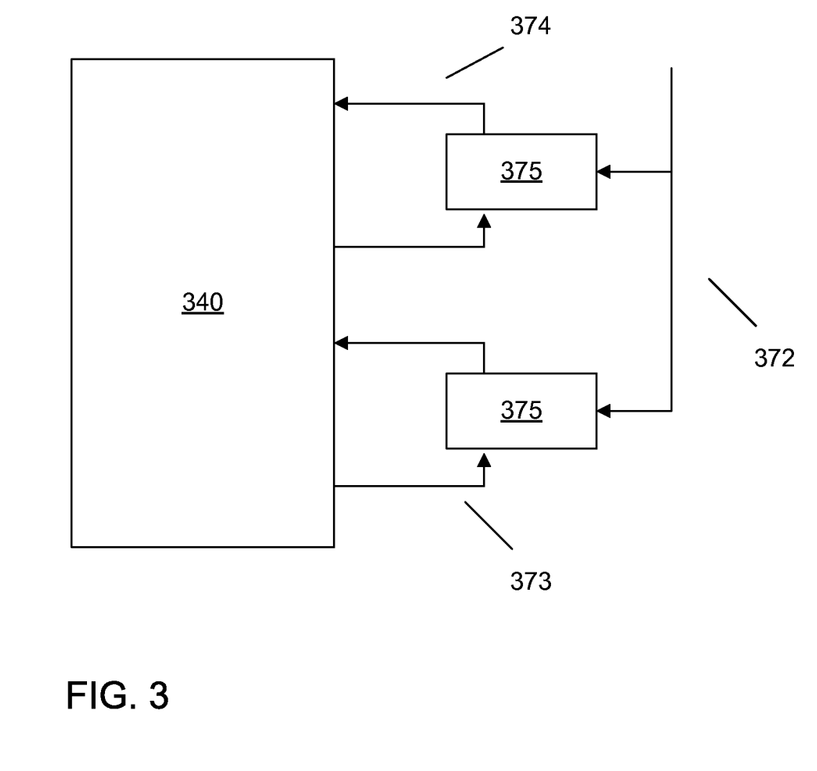
FIG. 3 schematically shows a portion of a reaction system according to an embodiment of the invention.

Optional Introduction of Hydrogen into Reactor with Continuous Liquid Phase Environment FIG. 3 schematically shows an option for introducing hydrogen into a liquid-continuous reactor. In FIG. 3, two mixers 375 are shown for mixing hydrogen with a liquid. Side streams of liquid 373 can be removed from reactor 340 and introduced into mixers 375. The mixers dissolve hydrogen from hydrogen stream 372 into liquid 373, e.g., to at least approximately the solubility limit (saturation point). The saturated liquid 374 can then be returned to the reactor 340.

Example 4

Example of Divided Wall Column

Based on simulations, the following divided wall column is predicted to be suitable for various embodiments of the invention. In this embodiment, a divided wall column having a height of about 35 meters was simulated. Table 1 provides further information regarding the details of the divided wall column.

TABLE 1

| Section | Tray nos. | Tray passes | Tray spacing (mm) | Tray effic. | Sec. height (m) |
|---|---|---|---|---|---|
| 1 | 2-6 | 1 | ~610 | ~75% | ~4.3 |
| 2 | 7-18 | 2 | ~510 | ~65% | ~9.4 |
| 3 | 19-26 | 2 | ~840 | ~65% | ~10.3 |
| Flash zone | | | | | ~3.0 |
| 4 | 27-30 | 2 | ~610 | ~50% | ~4.9 |
| Sump | | | | | ~3.0 |

The divided wall column described in Table 1 was simulated for fractionation of the output of a configuration similar to the reactors shown in Example 2. The dividing wall for the column in Table 1 can be at least as tall as about the height of the sump plus zone 4, and can be less than about the total height of the sump plus section 4 plus the flash zone. Thus, for the dividing wall column shown in Table 1, the dividing wall can be from about 7.9 meters to about 10.9 meters. Additionally or alternately, the height of the dividing wall can be selected so that any contamination between fractions produced in different separate volumes is below a desired level.

In the simulations for the divided wall column, the dividing wall resulted in two different sized non-common volumes. The first separate volume, corresponding to the separate volume for the hydrotreating/hydrocracking product, represented about 59% of the total volume. The two separate volumes for the divided wall column were selected to have volumes that were roughly similar to individual fractionation columns suitable for the same separation.

The divided wall column described in Table 1 allowed for fractionation of two distinct products from each of the separate areas below the height of the dividing wall. For an initial vacuum gas oil feed, the separate products included a bottoms product and a diesel boiling range product for each separate area. The bottoms product and diesel boiling range product from the second separate volume of the divided wall column corresponded to products with improved cold flow properties relative to the products from the first separate volume.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method for producing low sulfur distillate products, comprising:
   hydrotreating a feedstock under effective hydrotreating conditions;
   hydrocracking the hydrotreated feedstock in a first hydrocracking stage under first effective hydrocracking conditions;
   fractionating the hydrocracked feedstock in a first volume of a divided wall column fractionator to produce at least a first diesel product fraction and a first bottoms fraction;
   hydrocracking a portion of the first bottoms fraction in a second hydrocracking stage having a continuous liquid environment under second effective hydrocracking conditions;
   dewaxing the hydrocracked portion of the bottoms fraction in a dewaxing stage having a continuous liquid environment under effective catalytic dewaxing conditions; and
   fractionating the hydrocracked, dewaxed bottoms fraction in a second volume of the divided wall column fractionator to produce at least a second diesel product fraction and a second bottoms fraction,
   wherein the second diesel fraction has at least one improved cold flow property relative to the first diesel fraction, and the second bottoms fraction has at least one improved cold flow property relative to the first bottoms fraction.

2. The method of claim 1, wherein the first effective hydrocracking conditions include a temperature from about 200° C. to about 450° C., a total pressure from about 5 barg (about 0.5 MPag) to about 300 barg (about 30 MPag), an LHSV from about 0.05 $hr^{-1}$ to about 10 $hr^{-1}$, and a hydrogen treat gas rate from about two times to about fifteen times the hydrogen consumed during the hydrocracking, the first hydrocracking stage being in a continuous gas phase environment.

3. The method of claim 1, wherein the first effective hydrocracking conditions include a temperature from about 200° C. to about 450° C., a hydrogen partial pressure from about 5 barg (about 0.5 MPag) to about 300 barg (about 30 MPag), and an LHSV from about 0.05 $hr^{-1}$ to about 10 $hr^{-1}$, the first hydrocracking stage being in a continuous liquid phase environment.

4. The method of claim 1, wherein the second effective hydrocracking conditions include a temperature from about 200° C. to about 450° C., a hydrogen partial pressure from about 5 barg (about 0.5 MPag) to about 300 barg (about 30 MPag), and an LHSV from about 0.05 $hr^{-1}$ to about 10 $hr^{-1}$.

5. The method of claim 1, wherein the effective catalytic dewaxing conditions include a temperature from about 280° C. to about 380° C., a hydrogen partial pressure from about 300 psig (about 2.1 MPag) to about 3000 psig (about 20.7 MPag), and an LHSV from about 0.1 $hr^{-1}$ to about 5.0 $hr^{-1}$.

6. The method of claim 1, wherein the at least one improved cold flow property is cloud point and the cloud point of the second diesel fraction is at least about 10° C. less than the cloud point of the first diesel fraction.

7. The method of claim 1, wherein the sulfur content of the first diesel fraction is about 15 wppm or less.

8. The method of claim 1, wherein the at least one improved cold flow property is pour point and the pour point of the second bottoms fraction is at least about 10° C. less than the pour point of the first bottoms fraction.

9. The method of claim 1, wherein the effective hydrotreating conditions include an LHSV from about 0.3 $hr^{-1}$ to 5.0 $hr^{-1}$, a total pressure from about 500 psig (about 3.4 MPag) to about 3000 psig (about 20.7 MPag), a temperature from about 650° F. (about 343° C.) to about 800° F. (about 427° C.), and a hydrogen treat gas rate from about two times to about five times the hydrogen consumed during the hydrotreating.

10. The method of claim 1, wherein the second diesel fraction and the second bottoms fraction are not recycled to the dewaxing stage, and wherein said hydrocracking of the bottoms fraction further comprises hydrocracking of a portion of the first diesel fraction.

* * * * *